US011994154B2

(12) United States Patent
Papoin

(10) Patent No.: US 11,994,154 B2
(45) Date of Patent: May 28, 2024

(54) SERVOVALVE HAVING A LINEAR ACTUATOR AND MECHANICAL FEEDBACK

(71) Applicant: SAFRAN AEROSYSTEMS, Plaisir (FR)

(72) Inventor: Matthieu Papoin, Moissy-Cramayel (FR)

(73) Assignee: SAFRAN AEROSYSTEMS, Plaisir (FR)

(*) Notice: Subject to any disclaimer, the term of this patent is extended or adjusted under 35 U.S.C. 154(b) by 0 days.

(21) Appl. No.: 17/911,084

(22) PCT Filed: Mar. 12, 2021

(86) PCT No.: PCT/EP2021/056407

§ 371 (c)(1),
(2) Date: Sep. 12, 2022

(87) PCT Pub. No.: WO2021/180960

PCT Pub. Date: Sep. 16, 2021

(65) Prior Publication Data

US 2023/0145967 A1 May 11, 2023

(30) Foreign Application Priority Data

Mar. 13, 2020 (FR) ....................................... 2002524

(51) Int. Cl.
*F15B 13/043* (2006.01)

(52) U.S. Cl.
CPC ................................ *F15B 13/0438* (2013.01)

(58) Field of Classification Search
CPC ......................... F15B 13/0438; F15B 13/0436
USPC ..................................................... 137/625.62
See application file for complete search history.

(56) References Cited

U.S. PATENT DOCUMENTS

| | | | | |
|---|---|---|---|---|
| 5,085,125 A * | 2/1992 | Emo | F15B 13/044 | 137/625.65 |
| 6,269,733 B1 * | 8/2001 | Reust | F15B 13/0438 | 91/415 |
| 7,093,607 B2 * | 8/2006 | Rodriguez | F16K 11/07 | 137/625.69 |
| 7,210,500 B2 * | 5/2007 | Achmad | F15B 19/002 | 73/1.72 |
| 7,290,565 B2 * | 11/2007 | Achmad | C09B 67/0015 | 137/625.61 |
| 8,302,629 B2 * | 11/2012 | Hattori | F15B 13/0403 | 137/625.61 |

(Continued)

FOREIGN PATENT DOCUMENTS

| | | |
|---|---|---|
| FR | 1 511 251 A | 1/1968 |
| FR | 2 046 759 A1 | 3/1971 |

OTHER PUBLICATIONS

International Search Report for PCT/EP2021/056407 dated Jun. 7, 2021.

*Primary Examiner* — Patrick C Williams
(74) *Attorney, Agent, or Firm* — Sughrue Mion, PLLC

(57) ABSTRACT

A servovalve having a pilot stage includes two hydraulic elements that are movable relative to each other so as to move a power-directing member, the pilot stage including a linear actuator having a main pusher arranged to modify the relative position of the hydraulic elements. The pilot stage has a position feedback lever.

10 Claims, 14 Drawing Sheets

(56) References Cited

U.S. PATENT DOCUMENTS

| | | | | |
|---|---|---|---|---|
| 9,897,116 | B2 * | 2/2018 | Ozzello | F15B 13/0436 |
| 2003/0178073 | A1 * | 9/2003 | Jansen | F15B 13/0402 137/625.64 |

* cited by examiner

SERVOVALVE HAVING A LINEAR ACTUATOR AND MECHANICAL FEEDBACK

CROSS REFERENCE TO RELATED APPLICATIONS

This application is a National Stage of International Application No. PCT/EP2021/056407 filed Mar. 12, 2021, claiming priority based on French Patent Application No. 2002524 filed Mar. 13, 2020, the contents of each of which being herein incorporated by reference in their entireties.

FIELD OF THE INVENTION

The invention relates to the field of hydraulic servovalves, and more particularly to servovalves having a pilot stage including a linear actuator.

BACKGROUND OF THE INVENTION

A conventional servovalve is constituted by a pilot stage that controls a movable power-directing member of a power stage. The function of the power stage is to deliver a pressure or a flow rate that is proportional to an instruction applied to the pilot stage.

The pilot stage comprises two hydraulic elements, namely a hydraulic emitter (a nozzle or an ejector) and a hydraulic receiver (a flapper, a deflector, or a stationary receiver), such that modifying their relative position gives rise to pressure differences that are used for finely controlling movement of a movable power-directing member of the power stage of the servovalve. The movable power-directing member slides in a cylindrical sleeve located in the body of the servovalve. In general, the position of the hydraulic emitter or receiver is controlled by a torque motor that moves one of the hydraulic elements of the pilot stage facing the other. Movement of the movable power-directing member in its sleeve then establishes communication between a set of openings and drilled channels that are arranged to deliver a pressure or a flow rate that is proportional to the movement of said movable power-directing member. The mechanical directing member is connected to a mechanical feedback rod that is rigidly secured to that one of the hydraulic emitter and receiver that is movable.

There exist servovalves in which the hydraulic emitter or receiver is moved by a linear actuator. A position sensor measures the position of the power member and controls the linear actuator via power electronics serving to provide electronic feedback in a manner similar to the feedback provided mechanically by the feedback rod in a servovalve. Such electronics are expensive and have an unfavorable impact on the size, the weight, and the reliability of a servovalve.

OBJECT OF THE INVENTION

An object of the invention is to improve the reliability of a servovalve.

SUMMARY OF THE INVENTION

To this end, there is provided a servovalve having a pilot stage comprising a hydraulic element for ejecting a jet of fluid and a hydraulic element for receiving the jet of fluid, the hydraulic elements being movable relative to each other so as to modify their relative position and thus generate a pressure difference usable for moving a power-directing member of the servovalve, one of the two elements being mounted in a fixed position on a body of the servovalve and the other one of the elements being mounted at the movable end of a support that is connected to the body of the servovalve, the pilot stage including a linear actuator comprising a main pusher arranged to exert a force selectively on the support tending to modify the relative position of the hydraulic elements, the pilot stage also including a lever provided with a force transfer interface comprising an application, first point for applying an output force on the lever and a transmission, second point for transmitting the output force from the lever towards the support, the lever also being connected at a connection, third point to the power-directing member, the application, first point and the transmission, second point being situated on opposite sides of a first plane extending parallel to an output direction of the main pusher and perpendicularly to a neutral axis of the lever.

This results in a servovalve that is provided with a position feedback device that enables a linear actuator to be used without having recourse to a movement sensor for sensing the movement of the power-directing member. Having feedback that is entirely mechanical greatly improves the reliability of the servovalve of the invention.

Advantageously, the connection interface is arranged in such a manner that the connection at the application, first point or at the transmission, second point is a point connection or a ball joint connection or a linear connection or a pivot connection.

The vibration behavior of the servovalve is improved when the force transfer interface includes a cam and indeed when the cam is arranged to provide a pivot connection at the transmission, second point and/or when the support is connected to the body of the servovalve by a fixed connection.

In a particular embodiment, the force transfer interface includes both a first portion extending in a first direction intersecting the neutral axis of the lever and also a second portion extending in a second direction intersecting the second direction and/or the force transfer interface includes both a third portion extending in a third direction intersecting the neutral axis of the lever and also a fourth portion extending in a fourth direction intersecting the third direction.

Also advantageously, the transmission, second point acts on an auxiliary pusher that comes into contact with the rod in order to push it.

The fixed-position hydraulic element may be a fluid receiver and the hydraulic element carried by the rod is a fluid ejector, or else the fixed-position hydraulic element may be a fluid ejector and the movable element a fluid receiver.

In a preferred embodiment, the linear actuator comprises a piezoelectric actuator.

Other characteristics and advantages of the invention appear on reading the following description of particular, nonlimiting embodiments of the invention.

DETAILED DESCRIPTION OF THE INVENTION

Figure 1:
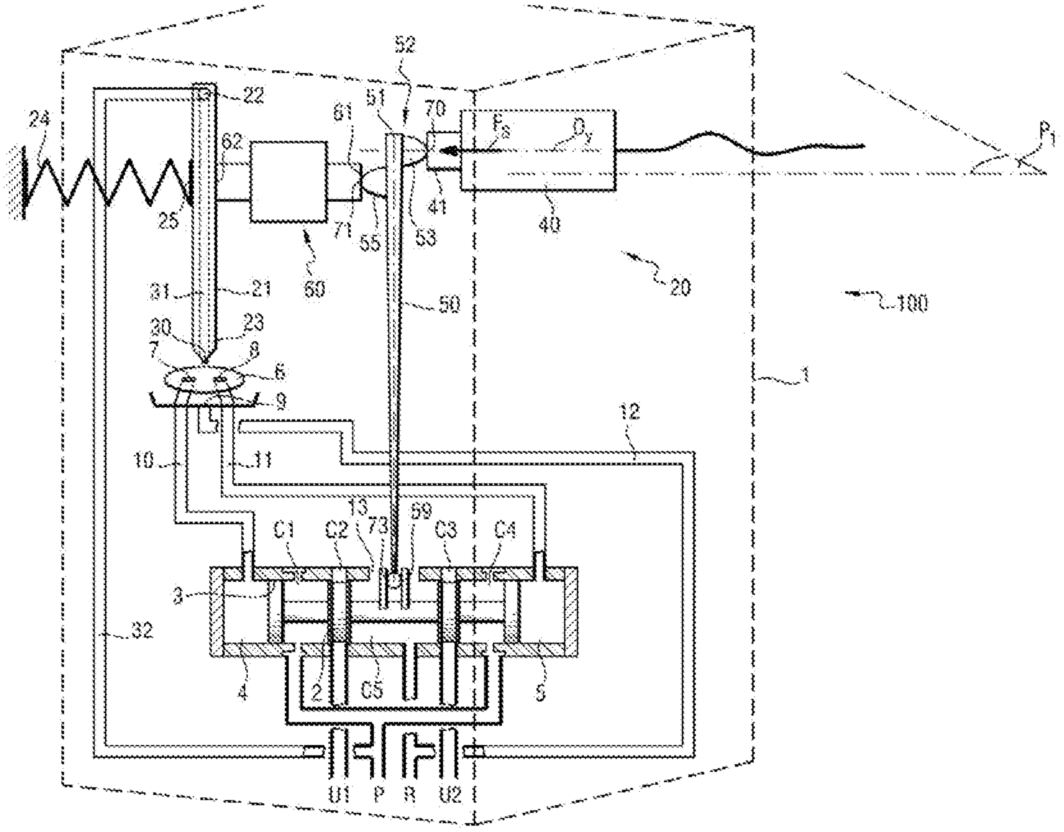
FIG. 1 is a diagrammatic side view of an servovalve in a first embodiment of the invention.
Figure 2:
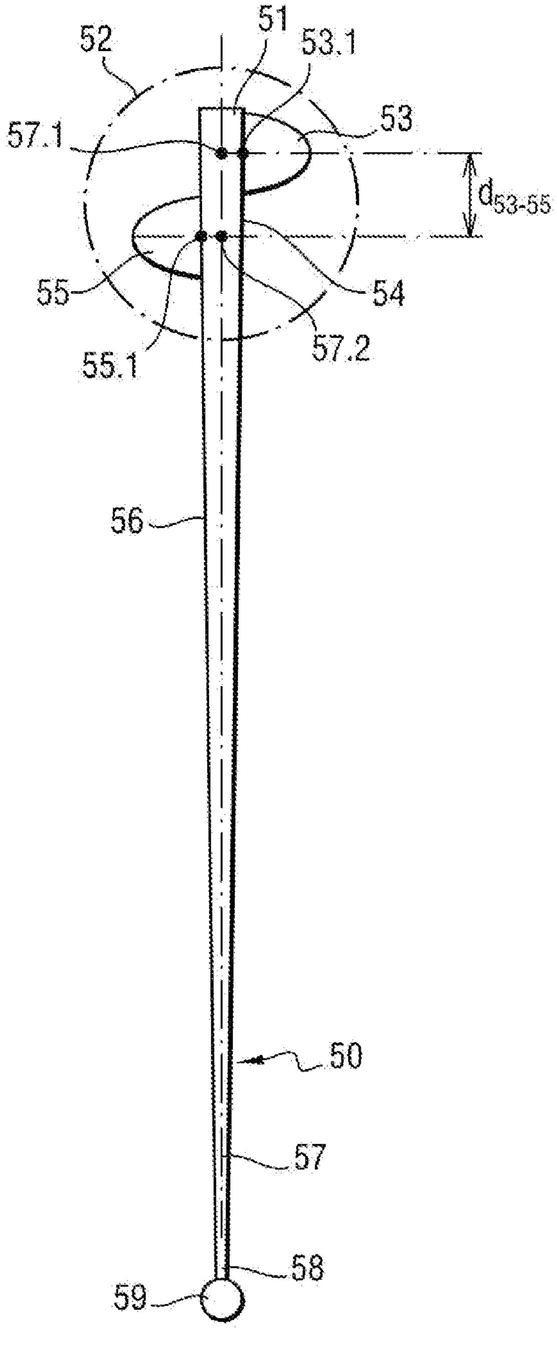
FIG. 2 is a diagrammatic side view of a lever in a first embodiment of the invention.

With reference to FIGS. 1 and 2, the invention is illustrated in this example in application to a servovalve for regulating air flow rate, the servovalve having two stages, one of which is a pilot stage. Naturally, the invention is not limited to this application, and can be used in other types of servovalve.

The servovalve, given overall reference 100, comprises a body 1 having a power-directing member 2 mounted therein to slide in leaktight manner in a cylindrical housing 3 so as to form the power-directing stage. The power-directing member 2 is movable between two extreme positions and it is shaped so as to define leaktight chambers C1, C2, C3, and C4 in the housing 3 such that in the extreme positions of the power-directing member 2 relative to a center (or neutral) position, they put the following into communication:

- either a feed port P with a first utilization port U1, and a return port R with a second utilization port U2; or else
- the feed port P with the second utilization port U2, and the return port R with the first utilization port U1.

The sliding of the power-directing member 2 in the housing 3 is controlled by means of pilot chambers 4 and 5, which are fed with fluid under pressure by a pressure distribution member, in this example, specifically a stationary receiver 6. The receiver 6 comprises a receptacle 9 with two orifices 7 and 8. The orifices 7 and 8 are in fluid flow communication with respective ones of the pilot chambers 4 and 5, via ducts 10 and 11. The receptacle 9 is connected to the return R by a duct 12.

The pilot stage 20 of the servovalve 100 includes a rod 21 pivotally mounted at its first end 22 to the body 1. The rod 21 has a second end 23 that is free and that has a fluid ejector 30 mounted thereon so as to face the receiver 6. A pressure spring 24 is mounted to act between the body 1 and a portion 25 of the rod 21 so as to exert a return force on the rod 21 causing it to pivot about the first end 22 in a direction that is counterclockwise as shown in FIG. 1. The rod 21 includes an internal duct 31 for delivering fluid to the fluid ejector 30. The internal duct 31 is in fluid flow connection with the feed port P of the servovalve 100 via a duct 32 formed in the body 1.

The pilot stage 20 includes a piezoelectric linear actuator 40 having a main pusher 41 for selectively applying a force on the rod 21.

The pilot stage also includes a lever 50 placed between the main pusher 41 and a first end 61 of an auxiliary pusher 60 that is slidably mounted on the body 1. The second end 62 of the auxiliary pusher 60 comes into contact with the portion 25 of the rod 21.

At its first end 51, the lever 50 is provided with a force transfer interface 52. The force transfer interface 52 comprises a first ceramic hemisphere 53 having a first center 53.1 and projecting from the first face 54 of the lever 50. A second ceramic hemisphere 55 having a second center 55.1 projects from the second face 56 of the lever 50, opposite from the first face 54. The first and second hemispheres 53 and 55 are located in such a manner that when the first and second centers 53.1 and 55.1 are projected orthogonally onto the neutral axis 57 of the lever 50 their respective first and second orthogonal projections 53.1 and 57.2 are spaced apart by a nonzero distance d53-55.

The second end 58 of the lever 50 includes a tungsten carbide bead 59 that is received in a notch 13 in the power-directing member 2.

Thus, an output force Fs of the main pusher 41 is applied on a first point 70 of the first hemisphere 53. The output force Fs is then transmitted via a second point 71 of the second hemisphere 55 to the first end 61 of the auxiliary pusher 60. The second end 62 of the auxiliary pusher 60 then acts on the rod 21 against the force of the spring 24 so as to move the fluid ejector 30 towards the first orifice 7. In corresponding manner, withdrawal of the main pusher 41 causes the fluid ejector 30 to move towards the second orifice 8 under the effect of the spring 24. Thus, depending on the voltage applied to the terminals of the actuator 40, the actuator exerts a force on the rod 21 that tends to move the fluid ejector 30 mounted on the end 23 of the rod 21 where it faces the receiver 6.

The first point 70 corresponds to an application, first point 70 for application of the output force. The second point 71 corresponds to a second point 71 for transmitting the output force. The bead 59 constitutes a third point 73 for connection with the power-directing member 2.

As can be seen in FIG. 1, the first point 70 for application of the output force Fs from the main pusher 41 on the lever 50 and the second point 71 for transmitting the output force Fs from the lever 50 to the rod 21 are situated on opposite sides of a first plane P1 lying parallel to an output direction Oy of the main pusher 41 and perpendicularly to the neutral axis 57 of the lever 50.

In operation, and as shown in FIG. 1, when a voltage Ue is applied to the terminals of the actuator 40 that corresponds to half a nominal utilization voltage Un, then the main pusher 41 of the actuator 40 is at half-stroke. The servovalve 100 is in its equilibrium state and of the ejector 30 ejects a jet of fluid towards the receptacle 9. No pressure difference is created between the pilot chambers 4 and 5, and the power directing member 2 remains in its neutral position, with the utilization ports U1 and U2 being isolated from the feed port P.

Figure 3:
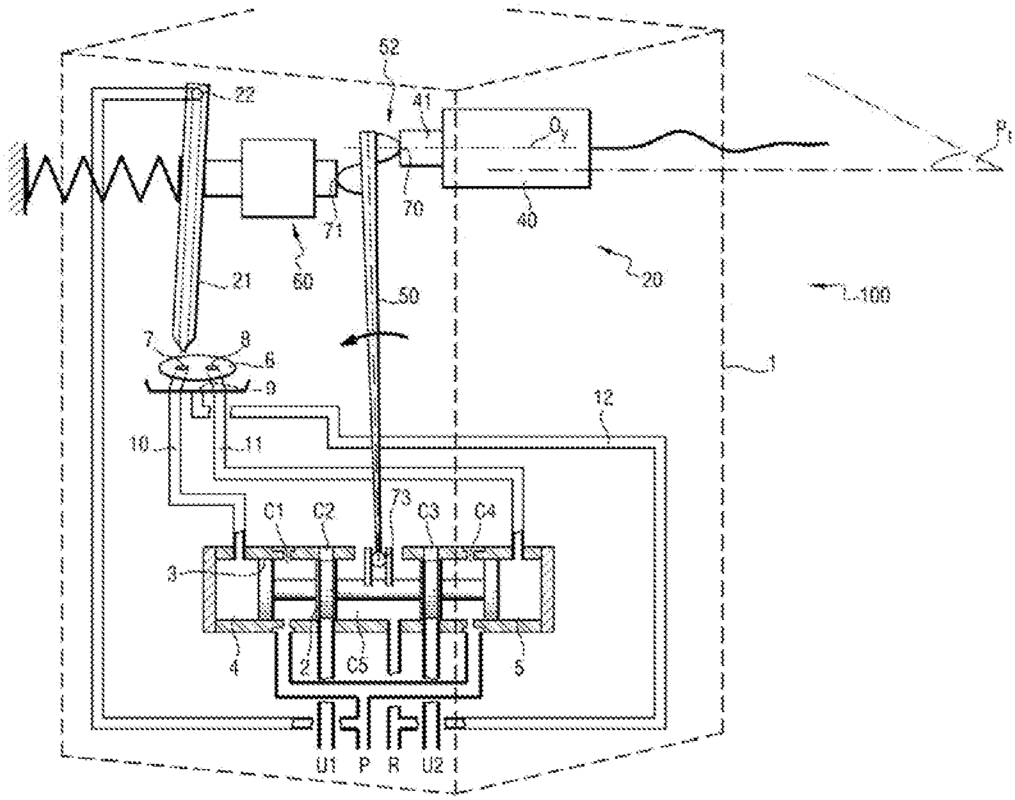
FIG. 3 is a diagrammatic view of the FIG. 1 servovalve in a first transient state.
Figure 4:
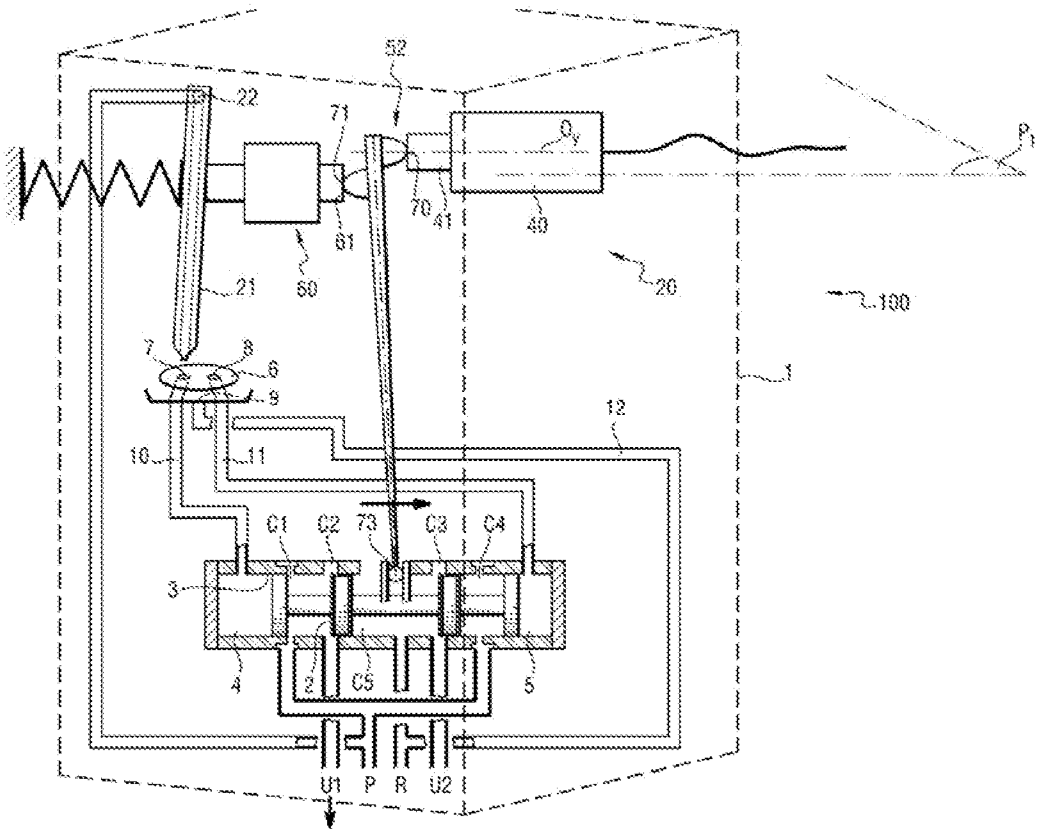
FIG. 4 is a diagrammatic view of the FIG. 1 servovalve in a second transient state.
Figure 5:
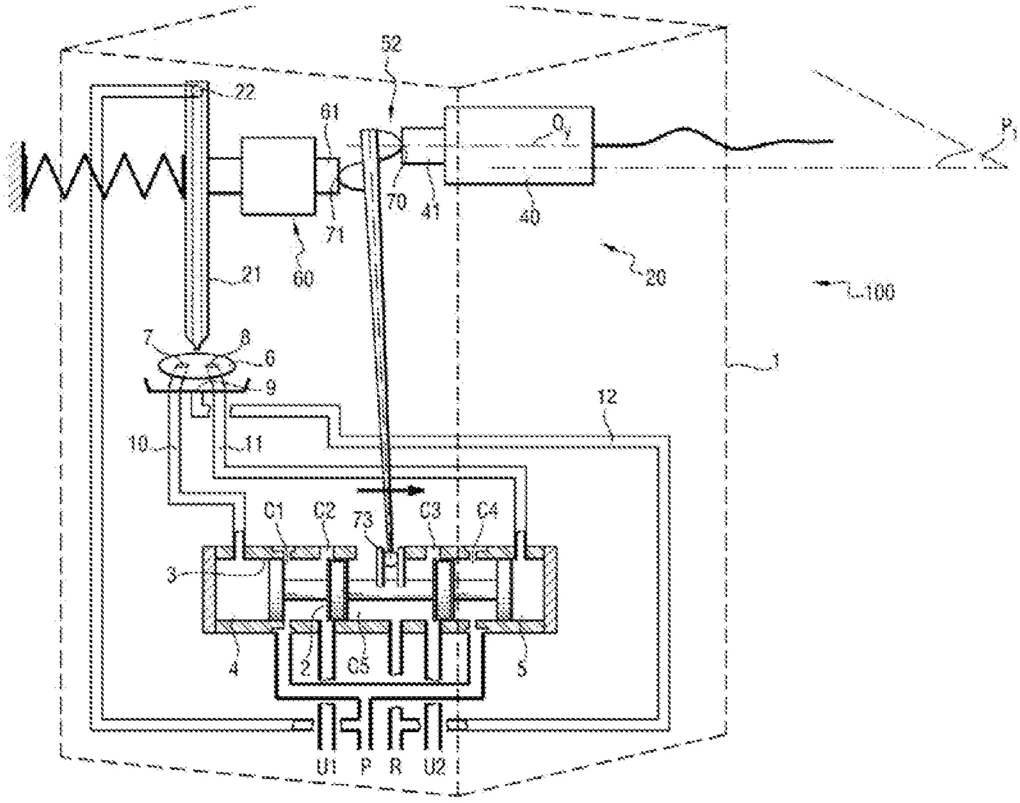
FIG. 5 is a diagrammatic view of the FIG. 1 servovalve in a third transient state.

When an input voltage Ue is applied to the terminals of the actuator 40 that corresponds to the nominal utilization voltage Un, then the voltage Ue causes the main pusher 41 to be extended to 100% of its stroke, and by acting on the first point 70, this causes the lever 50 to pivot about the third point 73 (in a counterclockwise direction as shown in FIG. 3), thereby moving the second point 71 and causing the auxiliary pusher 60 to shift in translation against the force of the spring 24. The ejector 30 is then to be found facing the orifice 7 and it ejects a jet of fluid towards the orifice 7 (FIG. 3). The pressure difference thus created between the pilot chambers 4 and 5 causes the power-directing member 2 to move in its housing 3 to the right as shown in FIGS. 1 and 3 (increasing the volume of the pilot chamber 4). The utilization port U1 is then put into fluid flow communication with the feed port P (FIG. 4). While the power-directing member 2 is moving, the third point 73 shifts in translation to the right (as shown in FIG. 4), thereby causing the lever 50 to pivot about the third point 73. This shift in translation causes the second contact point 71 to move towards the right (as shown in FIG. 4), thereby reducing the force transmitted by the second point 71 of the lever 50 to the auxiliary pusher 60 (FIG. 4) and causing the rod 21 to return to its initial position (FIG. 5). The servovalve then returns to its equilibrium state.

The illustrations of FIGS. 4 and 5 show stages in the movements of the lever 50 and of the auxiliary pusher 60 and they show the second point 71 of the lever 50 moving away from the first end 61 for the purposes of clarity. On reading the description, the person skilled in the art understands that the pivoting movement of the lever 50 about the third point 73 and the movement of the auxiliary pusher 60 to the left as shown in FIGS. 4 and 5) take place simultaneously.

Figure 6:
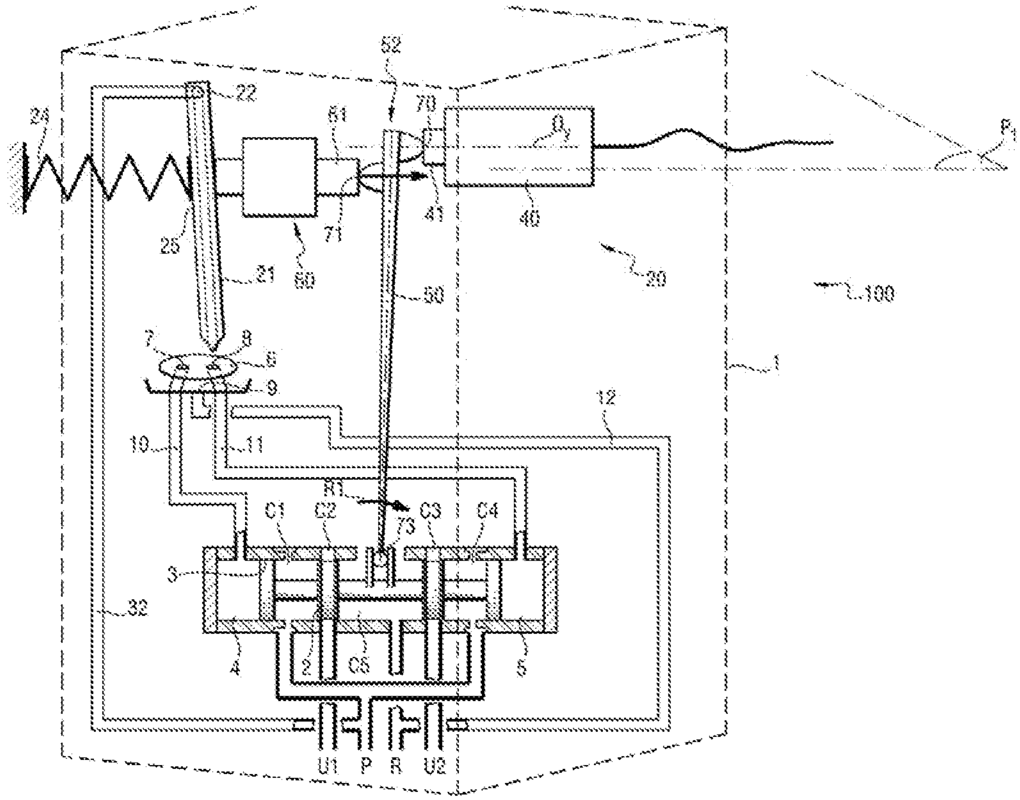
FIG. 6 is a diagrammatic view of the FIG. 1 servovalve in a fourth transient state.
Figure 7:
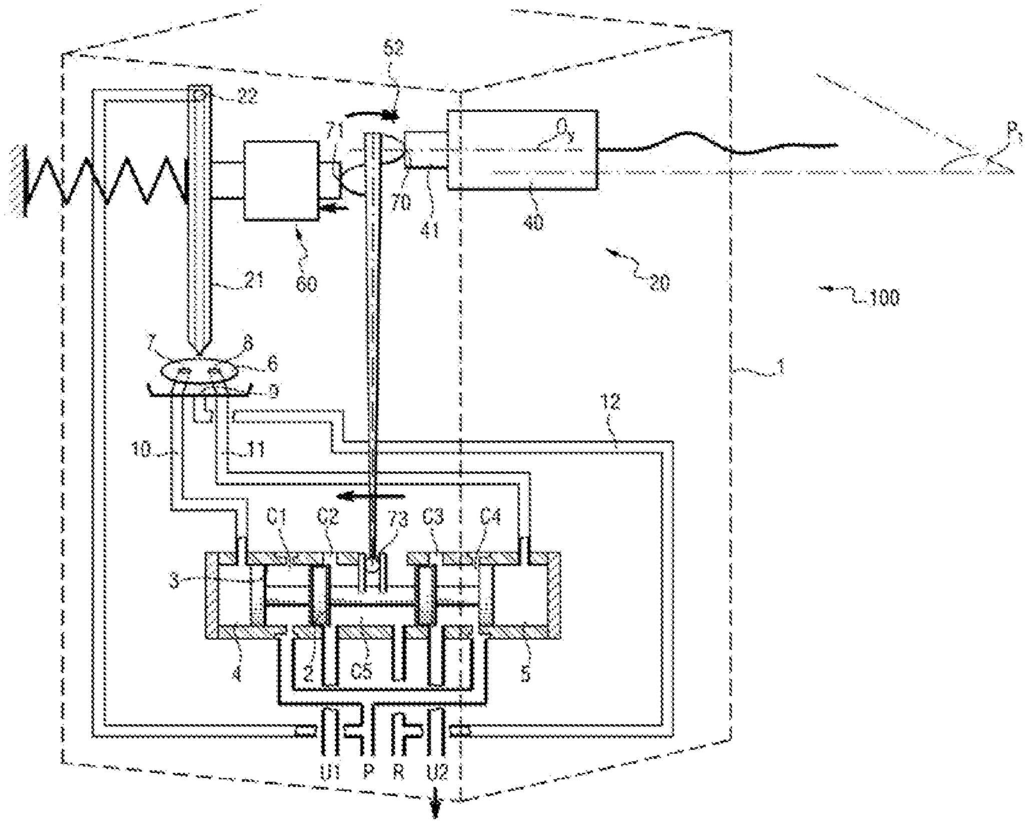
FIG. 7 is a diagrammatic view of the FIG. 1 servovalve in a fifth transient state.

When a zero input voltage Ue is applied to the terminals of the actuator 40, then the voltage Ue causes the main pusher 41 to be retracted, and by action of the spring 24, this causes the lever 50 to pivot R1 about the third point 73 (in a clockwise direction as shown in FIG. 6), thereby moving the second point 71 and causing the auxiliary pusher 60 to shift in translation to the right (as shown in FIG. 6). The ejector 30 is then to be found facing the orifice 8 and it ejects a jet of fluid towards the orifice 8 (FIG. 6). The pressure difference thus created between the pilot chambers 4 and 5 causes the power-directing member 2 to move in its housing 3 to the left as shown in FIGS. 1 and 6 (increasing the volume of the pilot chamber 5). The utilization port U2 is then put into fluid flow communication with the feed port P (FIG. 7). While the power-directing member 2 is moving, the third point 73 shifts in translation to the left (as shown in FIG. 7), thereby causing the lever 50 to pivot about the first point 70. This shift in translation causes the second contact point 71 to move towards the left (as shown in FIG. 7), thereby causing the auxiliary pusher 60 to shift towards the left (as shown in FIG. 7) and causing the rod 21 to return to its initial position (FIG. 7).

This results in a servovalve 100 that is provided with a position feedback device that enables a linear actuator to be used without having recourse to a movement sensor for sensing the movement of the power-directing member 2. Having feedback that is entirely mechanical greatly improves the reliability of the servovalve of the invention. The first point 70 and the second connection point 71 are always situated on opposite sides of the first plane P1 regardless of the position of the power-directing member 2 in its housing.

Elements identical or analogous to those described above are given same numerical references in the description below of the second, third and fourth embodiments.

Figure 8:
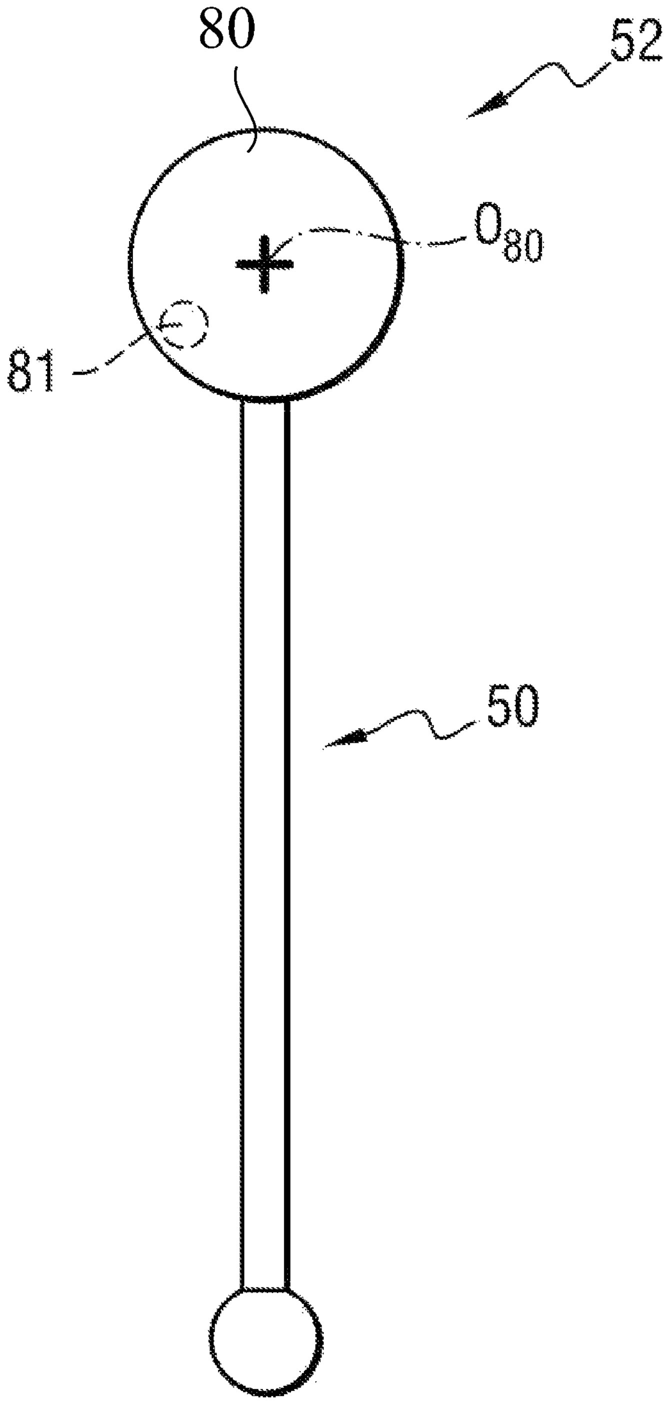
FIG. 8 is a diagrammatic side view of a lever in a second embodiment of the invention.
Figure 9:
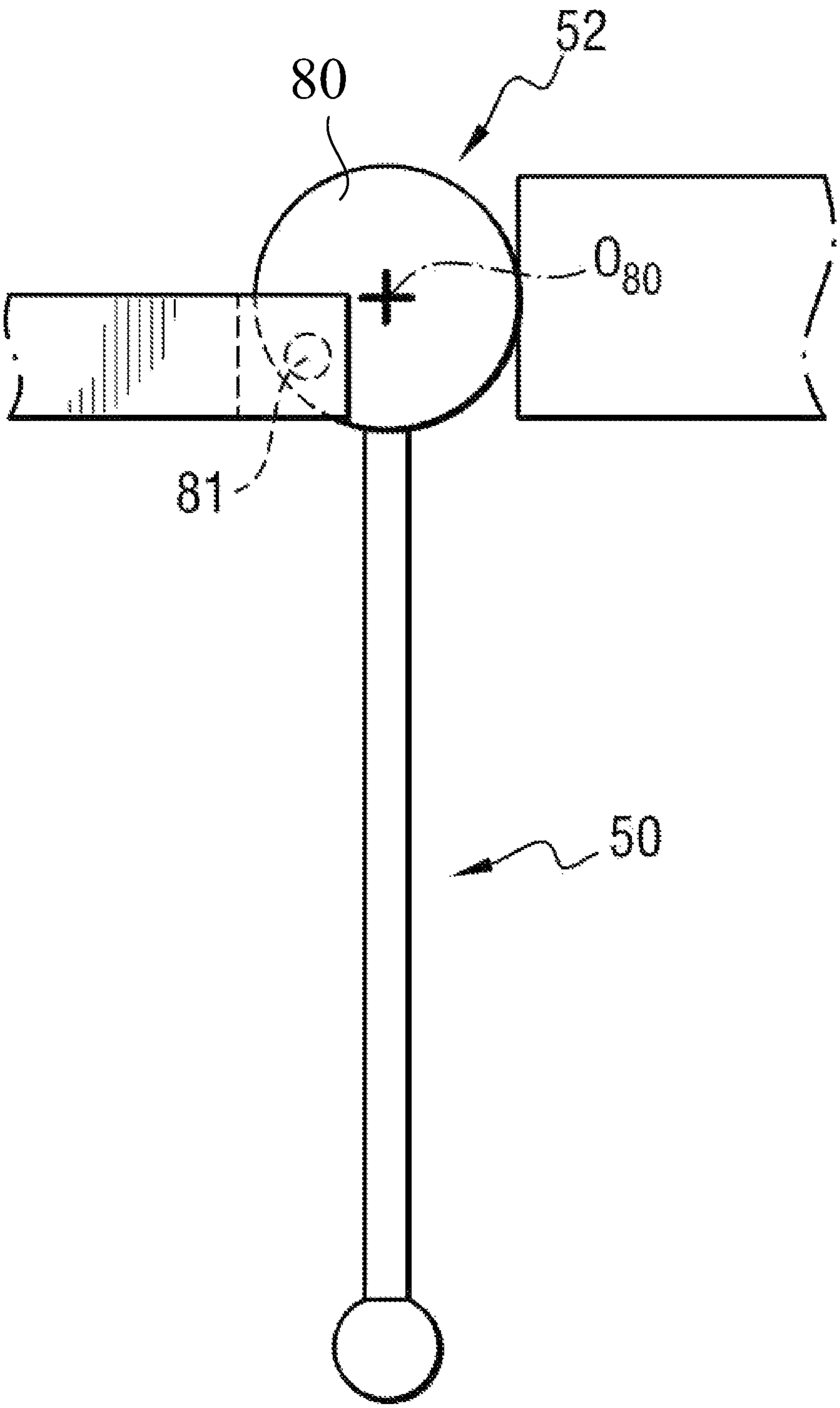
FIG. 9 is a diagrammatic face view of the FIG. 8 lever placed in situation.
Figure 10:
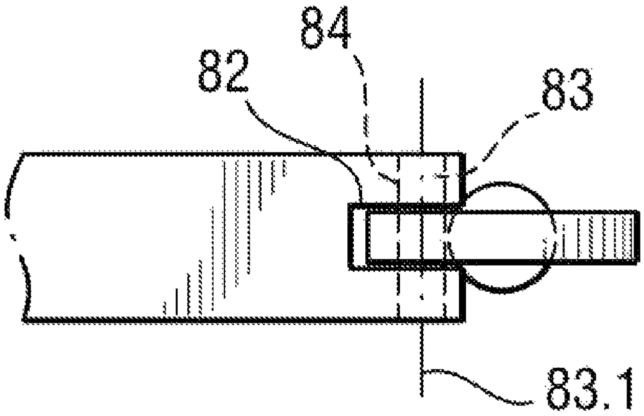
FIG. 10 is a diagrammatic plan view of the FIG. 9 lever.

In a second embodiment as shown in FIG. 8 to 10, the force transfer interface 52 includes a cam 80. In this example, the cam 80 is a disk of center $O_{80}$ provided in its bottom left quarter (as shown in FIGS. 8 and 9) with a first bore 81. The cam 80 is received in a slot 82 formed in the end 61 of the auxiliary pusher 60. A pin 83 is engaged in a second bore 84 of the auxiliary pusher 60 and passes through the first bore 81 in order to provide a pivot connection 83.1 at the second connection point 71. The first connection point 70 is provided by the right-hand quadrants (as shown in FIG. 9), and the second connection point 71 is provided by the pivot connection 83.1.

Figure 11:
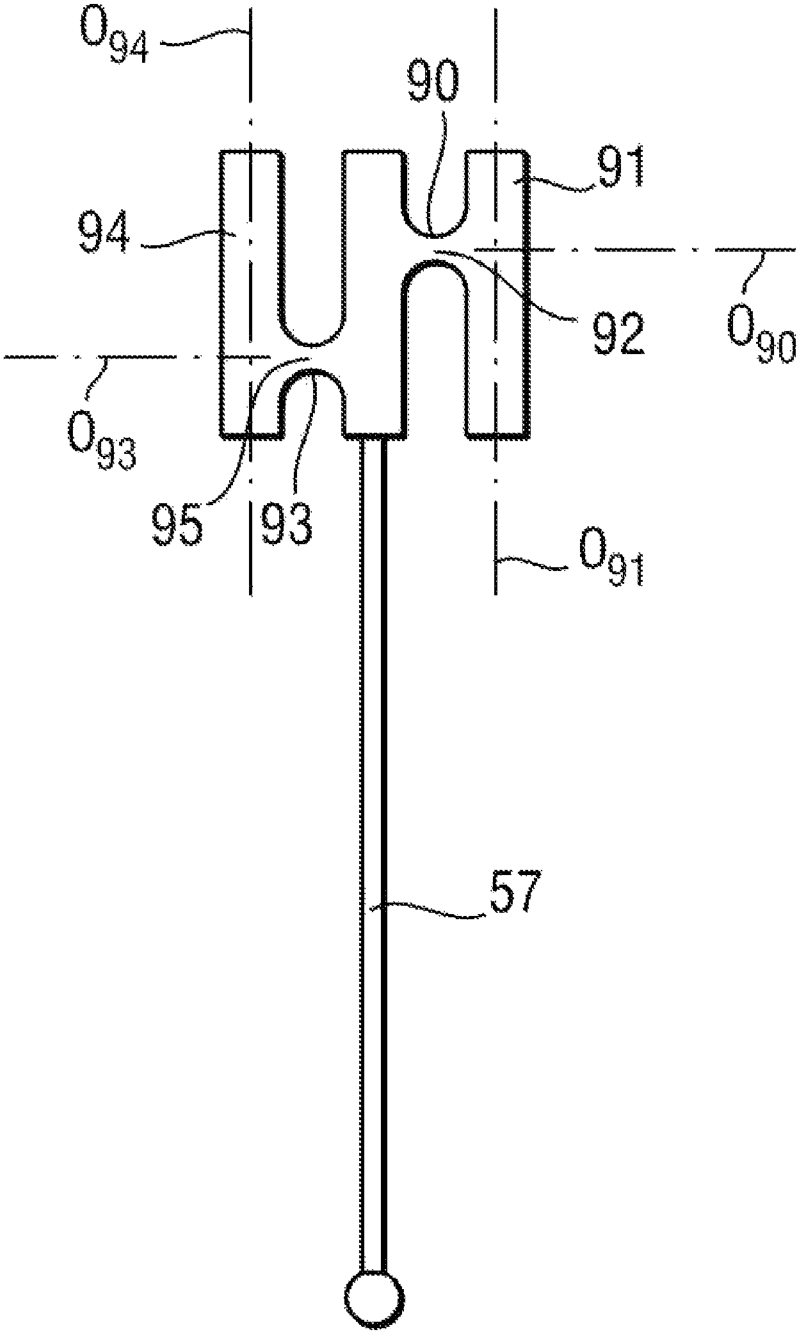
FIG. 11 is a diagrammatic detail view of a lever in a third embodiment of the invention.
Figure 12:
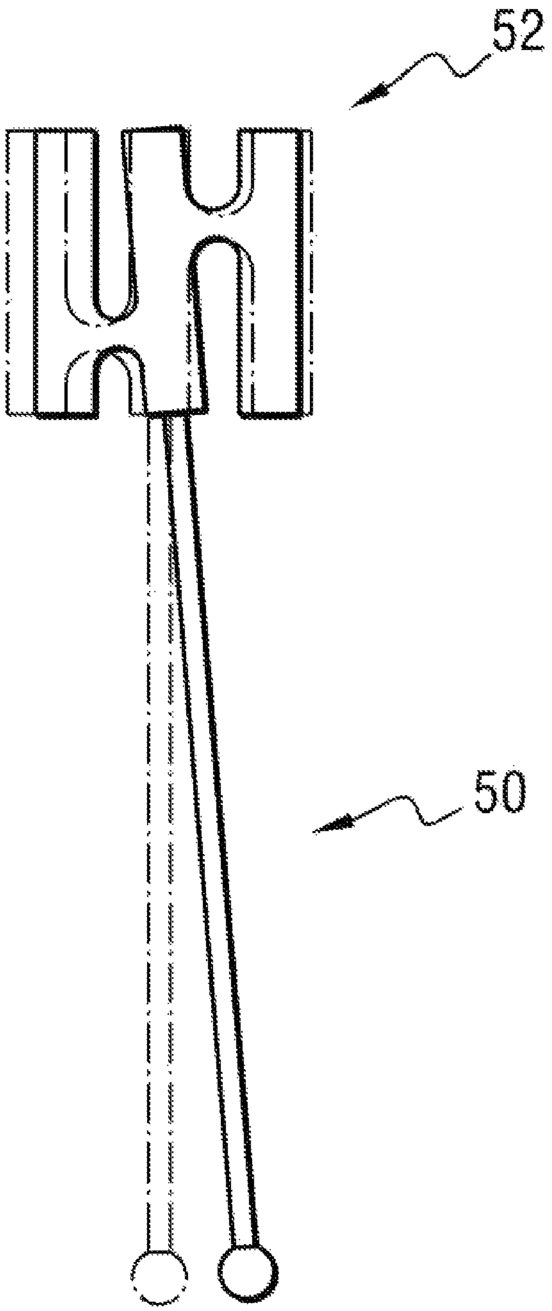
FIG. 12 is a diagrammatic detail view of the FIG. 10 lever in a first state.
Figure 13:
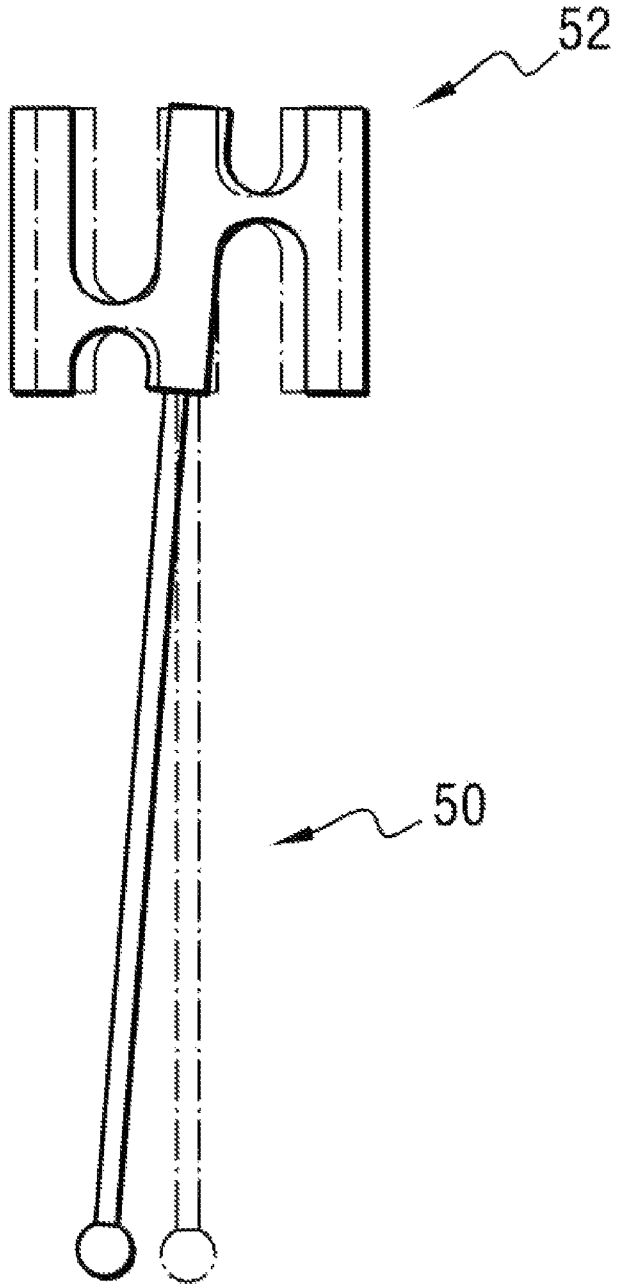
FIG. 13 is a diagrammatic detail view of the FIG. 10 lever in a second state.

In a third embodiment as shown in FIGS. 11 to 13, the interface 52 is made of steel and includes both a first portion 90 extending in a first direction O90 intersecting the neutral axis 57 of the lever 50 and also a second portion 91 extending in a second direction O91 intersecting the first direction O90. The section of the first portion 90 is smaller than the section of the second portion 91 and it provides a first flexing point 92 allowing the second portion 91 to pivot relative to the first portion 90. In symmetrical manner about a plane P57 containing the neutral axis 57, the interface 52 includes both a third portion 93 extending in a third direction O93 intersecting the neutral axis 57 of the lever 50 and a fourth portion 94 extending in a fourth direction O94 intersecting the third direction O93. The section of the third portion 93 is smaller than the section of the fourth portion 94 and it provides a second flexing point 95 allowing the fourth portion 94 to pivot relative to the third portion 93.

The first and second flexing points 92 and 95 correspond respectively to the first and second connection points 70 and 71. FIGS. 12 and 13 show two states of the interface 52 and of the lever 50 when they are subjected to movements of the main pusher 41 and of the auxiliary pusher 60.

Figure 14:
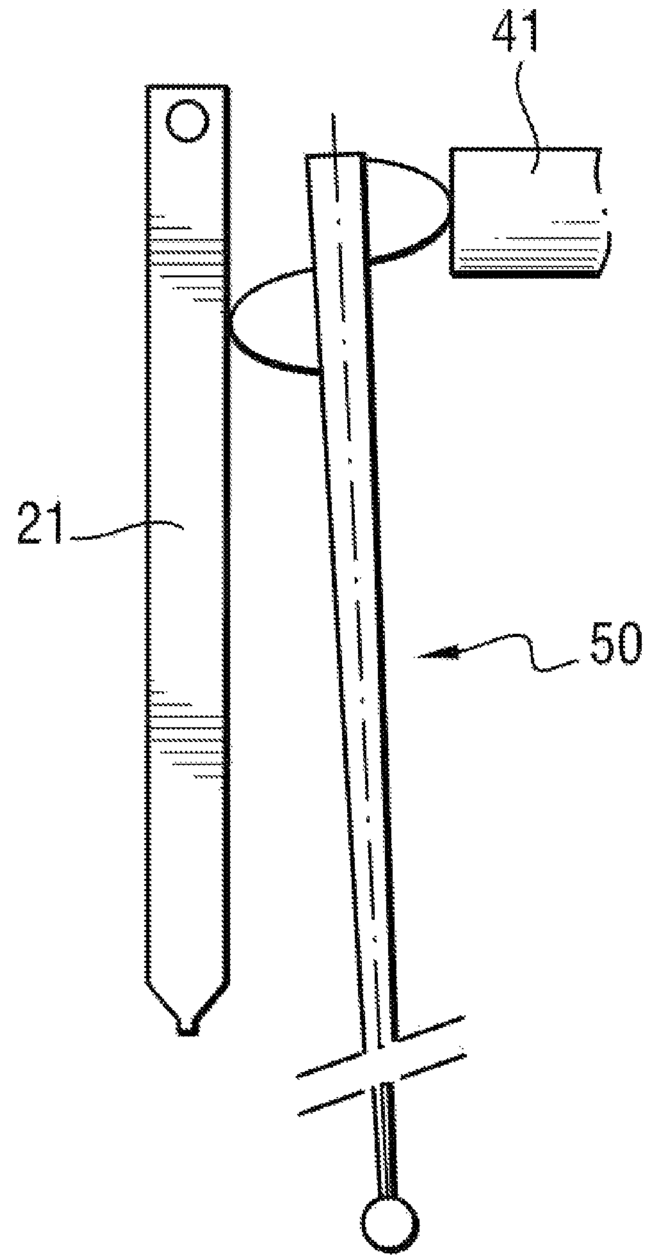
FIG. 14 is a diagrammatic detail view of a lever in a fourth embodiment of the invention.

In a fourth embodiment of the invention, as shown in FIG. 14, the lever 50 acts directly on the rod 21 in order to push it.

The first point 70 is a first point for application of the output force Fs of the actuator 40. The second point 71 is a second point for transmitting the output force Fs from the actuator 40.

The invention is naturally not limited to the above description, but covers any variant coming within the ambit defined by the claims.

In particular:

- although above the connections at the first and second points are, in this example, point connections provided by a sphere contacting a plane, the invention applies equally to other ways of providing a point connection or connections of other types, such as a ball joint, a linear connection, or a pivot connection;
- although above the first end of the rod is pivotally mounted on the body, the invention applies equally to other types of connection between the rod and the body of the servovalve, e.g. such as a fixed connection or a torsion column attached to a welded frame machined in the body of the servovalve, or indeed pressed into the body of the servovalve;
- although above the rod has an internal duct for delivering fluid to the fluid ejector, the invention applies equally to other types of fluid feed, e.g. such as feed via a flexible hose or via an external duct attached to the rod;
- although above the actuator is a piezoelectric actuator, the invention applies equally to other types of linear actuator, e.g. such as an electrical, pneumatic, or hydraulic jack;
- although above the stationary hydraulic element is a fluid receiver and the element mounted at the end of the rod is a fluid emitter, the invention applies equally to a fluid emitter in a stationary position on a body of the servovalve associated with a fluid receiver mounted at the end of the rod, e.g. a receiver such as a deflector or a flapper;

although above the pilot stage includes a rod on which a fluid ejector is mounted, the invention applies to other types of support, e.g. such as a blade;

although above the pilot stage includes a spring acting on the rod, the invention applies equally to other position return means, e.g. such as a hydraulic spring or the rod having an end that is fixed. Furthermore, the invention can operate without means for restoring the position of the support, e.g. such as when a second piezoelectric actuator is positioned facing the first end on the other side of the rod, with control of the second actuator being paired with control of the first actuator;

although above the transfer interface is positioned at a first end of the lever, the invention applies equally to a transfer interface situated at a distance from the end of the lever; and although above the second end of the rod has a tungsten carbide bead that is received in a notch of the power-directing member, the invention applies to other connection means for providing a third connection point, e.g. such as a ball joint, or a pivot.

The invention claimed is:

1. A servovalve having a pilot stage comprising a hydraulic element for ejecting a jet of fluid and a hydraulic element for receiving the jet of fluid, the hydraulic elements being movable relative to each other so as to modify their relative position and thus generate a pressure difference usable for moving a power-directing member of the servovalve, one of the two elements being mounted in a fixed position on a body of the servovalve and the other one of the elements being mounted at the movable end of a support that is connected to the body of the servovalve, the pilot stage including a lever provided with a force transfer interface comprising an application, first point for applying an output force on the lever and a transmission, second point for transmitting the output force from the lever towards the support, the lever also being connected at a connection, third point to the power-directing member, wherein:

the pilot stage comprises a linear actuator including a main pusher arranged to exert the output force selectively on the support to modify the relative position of the hydraulic elements; and the application, first point and the transmission, second point are situated on opposite sides of a first plane extending parallel to an output direction of the main pusher and perpendicularly to a neutral axis of the lever.

2. The servovalve according to claim 1, wherein the force transfer interface is arranged in such a manner that the connection at the application, first point or at the transmission, second point is a point connection or a ball joint connection or a linear connection or a pivot connection.

3. The servovalve according to claim 1, wherein the force transfer interface includes a cam.

4. The servovalve according to claim 3, wherein the cam is arranged to provide a pivot connection at the transmission, second point.

5. The servovalve according to claim 1, wherein the force transfer interface includes a first portion extending in a first direction intersecting the neutral axis of the lever and a second portion extending in a second direction intersecting the first direction.

6. The servovalve according to claim 5, wherein the force transfer interface includes a third portion extending in a third direction intersecting the neutral axis of the lever and a fourth portion extending in a fourth direction intersecting the third direction.

7. The servovalve according to claim 1, wherein the transmission, second point acts on an auxiliary pusher that comes into contact with the support in order to push the support.

8. The servovalve according to claim 1, wherein the fixed-position hydraulic element is a fluid receiver and the hydraulic element carried by the support is a fluid ejector.

9. The servovalve according to claim 1, wherein the support is connected to the body of the servovalve by a fixed connection.

10. The servovalve according to claim 1, wherein the linear actuator comprises a piezoelectric actuator.

* * * * *